United States Patent
Yabuki et al.

(10) Patent No.: US 9,155,016 B2
(45) Date of Patent: Oct. 6, 2015

(54) BASE STATION AND METHOD

(75) Inventors: Shogo Yabuki, Tokyo (JP); Kazunori Obata, Tokyo (JP); Seigo Harano, Tokyo (JP); Tadashi Uchiyama, Tokyo (JP); Mikio Iwamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 260 days.

(21) Appl. No.: 13/806,866

(22) PCT Filed: Jun. 23, 2011

(86) PCT No.: PCT/JP2011/064474
§ 371 (c)(1),
(2), (4) Date: Feb. 14, 2013

(87) PCT Pub. No.: WO2011/162361
PCT Pub. Date: Dec. 29, 2011

(65) Prior Publication Data
US 2013/0171993 A1 Jul. 4, 2013

(30) Foreign Application Priority Data
Jun. 25, 2010 (JP) ................................ 2010-145547

(51) Int. Cl.
*H04W 36/30* (2009.01)
*H04W 36/00* (2009.01)
*H04W 36/08* (2009.01)

(52) U.S. Cl.
CPC .......... *H04W 36/30* (2013.01); *H04W 36/0055* (2013.01); *H04W 36/08* (2013.01)

(58) Field of Classification Search
CPC .. H04W 36/0055; H04W 36/30; H04W 36/08
USPC ........................................................ 455/437
See application file for complete search history.

(56) References Cited

U.S. PATENT DOCUMENTS
2007/0249355 A1* 10/2007 Kang et al. .................... 455/439

OTHER PUBLICATIONS
3GPP TS 36.331 V9.1.0; "3rd Generation Partnership Project; Technical Specification Group Radio Access Network; Evolved Universal Terrestrial Radio Access (E-UTRA) Radio Resource Control (RRC); Protocol specification (Release 9)"; Dec. 2009 (232 pages).
International Search Report issued in PCT/JP2011/064474 mailed Aug. 23, 2011 (3 pages).
Written Opinion issued in PCT/JP2011/064474 mailed Aug. 23, 2011 (7 pages).

* cited by examiner

*Primary Examiner* — Kashif Siddiqui
*Assistant Examiner* — Minjung Kim
(74) *Attorney, Agent, or Firm* — Osha Liang LLP

(57) ABSTRACT

A base station is disclosed. The base station includes: a reconnection setting information generation unit configured, in a case where handover is requested from a first base station, after a reconnection request signal is received from a mobile apparatus, to generate reconnection setting information to be used for specifying the mobile apparatus; a transmission unit configured to transmit a reconnection request signal to the first base station; a receiving unit configured to receive reconnection setting information to be used for specifying the mobile apparatus from a second base station that is a destination of handover of the mobile apparatus after the second base station receives a reconnection request signal from the mobile apparatus; a reconnection setting information holding unit configured to hold the reconnection setting information; and a connection processing unit configured to perform reconnection processing with the mobile apparatus by using the reconnection setting information held in the reconnection setting information holding unit in accordance with a reconnection request signal from the mobile apparatus after initial connection processing between the second base station and the mobile apparatus.

6 Claims, 6 Drawing Sheets

BASE STATION AND METHOD

TECHNICAL FIELD

The present invention relates to a radio communication system.

BACKGROUND ART

Specifications for Long Term Evolution (LTE) are drafted by a Wideband-Code Division Multiple Access (W-CDMA) standardization group 3GPP (3rd Generation Partnership Project). The LTE is a standard developed from High Speed Packet Access (HSPA) that is an extended technique of the W-CDMA. In the LTE, high speed communications of higher than 100 Mbps in downlink and higher than 50 Mbps in uplink are realized to achieve delay reduction and to improve frequency utilization.

In the specification, handover is defined in which a mobile apparatus switches radio circuits between base stations (eNB: evolved NodeB) that perform radio communications by LTE. The handover between the base stations that perform radio communications by LTE is also called Inter-eNB handover. Also, reconnection processing is defined in which, when the mobile apparatus temporarily detects deterioration of radio quality, the mobile apparatus continues communication without re-originating.

PRIOR ART DOCUMENTS

[Non-patent document 1] TS36.331 V9.1.0 2009 12

SUMMARY OF THE INVENTION

Problem to be Solved by the Invention

When the Inter-eNB handover is performed, the mobile apparatus (UE: User Equipment) measures radio quality, and reports, to the base station with which the mobile apparatus is performing radio communication, that quality of another base station is good, so as to perform switching processing to a radio circuit of the other base station. The base station and the other base station may be base stations that perform communication based on a similar radio communication scheme. The radio communication scheme may be the LTE. The base station may be called a source base station (S-eNB: Source eNodeB). The other base station may be called a target base station (T-eNB: Target eNodeB).

In the Inter-eNB handover procedure, since the source base station has information (to be referred to as "source base station reconnection setting information" hereinafter) set for reconnection between the source base station and the mobile apparatus, reconnection between the mobile apparatus and the source base station is available. On the other hand, reconnection between the mobile apparatus and the target base station becomes possible using the source base station reconnection setting information received from the source base station in the Inter-eNB handover procedure and information (to be referred to as "target base station reconnection setting information" hereinafter) that is set by the target base station for reconnection with the mobile apparatus. Since there is a possibility that the mobile apparatus performs reconnection due to radio quality deterioration in the Inter-eNB handover procedure, the source base station reports the source base station reconnection setting information to the target base station. Since the source base station reconnection setting information is reported to the target base station, the mobile apparatus can reconnect to the target base station by the source base station reconnection setting information even before the mobile apparatus initially connects to the target base station in the Inter-eNB handover procedure.

In order to perform reconnection processing, the mobile apparatus needs to report, to a base station, information set by a base station with which the mobile apparatus has been communicating before occurrence of reconnection. The base station that receives the report from the mobile apparatus determines whether the reported information is correct. The base station determines whether to accept the reconnection.

In the Inter-eNB handover procedure, after handover preparation completes in the target base station, the mobile apparatus receives a handover instruction signal from the source base station. The handover instruction signal may be a signal for instructing handover to the target base station. After the mobile apparatus completes initial connection with the target base station, the mobile apparatus applies the target base station reconnection setting information. The initial connection includes a random access channel (RACH) procedure. In other words, when the mobile apparatus sends a reconnection request before initial connection completes, the mobile apparatus applies the source base station reconnection setting information, and when the mobile apparatus sends a reconnection request after initial connection completes, the mobile apparatus applies the target base station reconnection setting information.

After the mobile apparatus applies the target base station reconnection setting information, the mobile apparatus transmits a handover complete signal to the target base station. However, when radio quality deteriorates after the mobile apparatus applies the target base station reconnection setting information, there may be a case where the handover complete signal is not received by the target base station.

In this case, the mobile apparatus determines that it is necessary to perform reconnection, so that the mobile apparatus performs cell selection for performing reconnection. As a result of the cell selection, there may be a case where the source base station is selected. In the case where the source base station is selected, the mobile apparatus performs initial connection with the source base station so as to transmit a reconnection request signal to the source base station. However, since the source base station cannot prepare the target base station reconnection setting information, the base station cannot connect to the mobile apparatus. Therefore, the mobile apparatus fails reconnection.

The present invention is contrived in view of the above-mentioned problem, and an object of the present invention is to provide a base station that can reconnect with a mobile apparatus even after initial connection completes between another base station and the mobile apparatus in the Inter-eNB handover procedure, and a method.

Means for Solving the Problem

A base station according to an embodiment of the present invention is a base station that performs radio communication with a mobile apparatus, including:

a reconnection setting information generation unit configured, in a case where handover is requested from a first base station, after a reconnection request signal is received from the mobile apparatus, to generate reconnection setting information to be used for specifying the mobile apparatus;

a transmission unit configured to transmit a reconnection request signal generated by the reconnection setting information generation unit to the first base station;

a receiving unit configured to receive reconnection setting information to be used for specifying the mobile apparatus from a second base station that is a destination of handover of the mobile apparatus after the second base station receives a reconnection request signal from the mobile apparatus;

a reconnection setting information holding unit configured to hold the reconnection setting information received by the receiving unit; and a reconnection processing unit configured to perform reconnection processing with the mobile apparatus by using the reconnection setting information held in the reconnection setting information holding unit in accordance with a reconnection request signal from the mobile apparatus after initial connection processing between the second base station and the mobile apparatus.

A method according to an embodiment of the present invention is a method in a base station that performs radio communication with a mobile apparatus, including:

a receiving step of receiving reconnection setting information to be used for specifying the mobile apparatus from another base station that is a destination of handover of the mobile apparatus after the other base station receives a reconnection request signal from the mobile apparatus;

a reconnection setting information holding step of holding the reconnection setting information received by the receiving step;

a reconnection processing step of performing reconnection processing with the mobile apparatus by using the reconnection setting information held by the reconnection setting information holding step in accordance with a reconnection request signal from the mobile apparatus after initial connection processing between the other base station and the mobile apparatus; and a reconnection setting information transmission step of transmitting reconnection setting information to a base station that transmits a handover request signal, wherein the reconnection setting information is to be used for performing reconnection processing with the mobile apparatus and is set in accordance with the handover request signal for causing the mobile apparatus to perform handover.

Effect of the Present Invention

According to the disclosed base station and the method, it is possible to reconnect with a mobile apparatus even after initial connection completes between another base station and the mobile apparatus in the Inter-eNB handover procedure.

EMBODIMENTS FOR CARRYING OUT THE INVENTION

Next, embodiments of the present invention are described by way of examples as set forth with reference to the drawings.

Throughout all of the drawings for illustrating the embodiments, the same reference symbols are used for the same functions, and descriptions thereof are not repeated.

Embodiments

Radio Communication System

An environment to which a base station according to the present embodiment is applied is described.

The environment to which the base station is applied may an environment in which multiple mobile communication systems are mixed. The mobile communication systems include an Evolved UTRA and UTRAN based mobile communication system. The Evolved UTRA and UTRAN based mobile communication system is also referred to as a Long Term Evolution (LTE). The mobile communication systems may further include a W-CDMA based mobile communication system.

A coverage area of the base station includes one or more cells. The cells include cells where radio communication is available at the same frequency band. Such cells where radio communication at the same frequency band is available may be referred to as a frequency layer.

Figure 1:
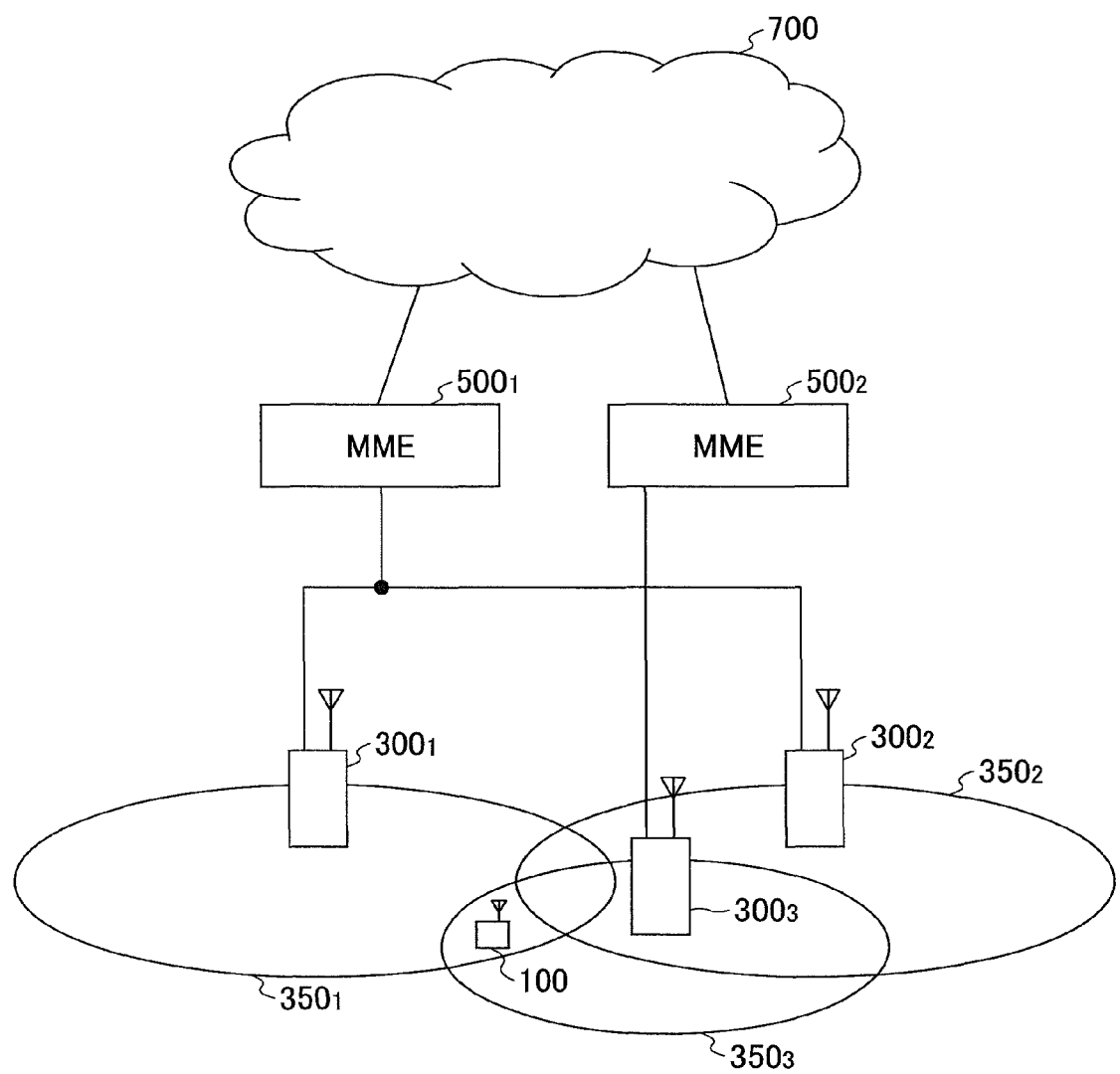
FIG. 1 is a schematic diagram showing an environment to which a base station in accordance with the present embodiment is applied.

FIG. 1 is a schematic diagram for illustrating an exemplary environment to which the base station is applied. In FIG. 1, by way of example, base stations $300_n$ (n is an integer satisfying n>1) in compliance with the LTE scheme and coverage areas of the base stations $300_n$ are illustrated. This area includes a cell $350_n$ where the base station $300_n$ can wirelessly communicate with the mobile apparatus 100. The area may include a cell where radio communication is available using a frequency band different from that for use in radio communication with the mobile apparatus 100. Also, the area may include a cell covered by another base station (not shown) different from the base station $300_n$. Also, the area may include a cell where radio communication is available in accordance with another radio access technology (RAT) different from the LTE. The other radio access technology may include the W-CDMA.

The base station $300_n$ is connected to a Mobility Management Entity (MME) $500_m$ (m is an integer of m>0). The MME may be realized by an exchange station. The MME $500_m$ is connected to a core network 700.

As an example, FIG. 1 shows three base stations. Also, FIG. 1 shows 2 MMEs. The base stations $300_1$ and $300_2$ are connected to the MME $500_1$. The base station $300_3$ is connected to MME $500_2$.

The mobile apparatus 100 performs radio quality measurement, and transmits "measurement result report signal" to a base station communicating with the mobile apparatus 100 when mobile apparatus 100 determines that radio quality of another base station is good. When the base station receives the "measurement result report signal", the base station transmits a "handover request signal" to a base station that is a handover destination candidate based on a measurement result included in the "measurement result report signal". As an example, a case is described where the mobile apparatus performs handover from the base station $300_1$ to the base station $300_2$. In the handover from the base station $300_1$ to the base station $300_2$, since the base station $300_1$ and the base station $300_2$ are connected to the same MME $500_1$, handover straddling MMEs is not performed. The handover between base stations connected to the same MME is called X2 handover. In the following, the base station $300_1$ may be referred to as "source base station $300_1$," and the base station $300_2$ may be referred to as "target base station $300_2$".

When the target base station $300_2$ receives the "handover request signal" from the source base station $300_1$, the target base station $300_2$ generates setting information (target base station reconnection setting information) for receiving reconnection from the mobile apparatus 100.

The target base station $300_2$ transmits a "handover request response signal" to the source base station $300_1$. The "handover request response signal" includes the target base station reconnection setting information. The target base station $300_2$ may transmit the target base station reconnection setting information to the source base station $300_1$.

When the source base station $300_1$ receives the "handover request response signal" from the target base station $300_2$, the source base station $300_1$ obtains the target base station reconnection setting information from the "handover request response signal" and holds it.

Initial connection completes between the mobile apparatus 100 and the target base station $300_2$. The initial connection may be also called early connection. After the initial connection completes, the mobile apparatus 100 detects deterioration of radio quality so that the mobile apparatus 100 starts reconnection processing. In a case where radio quality deteriorates, even though the mobile apparatus 100 transmits the "handover complete signal" to the target base station $300_2$, there may be a case in which the "handover complete signal" is not received by the target base station $300_2$. The "handover complete signal" is also called "RRC Connection Reconfiguration Complete". The mobile apparatus 100 performs selection of cell where reconnection processing is possible. As a result of the cell selection, the mobile apparatus determines that the source base station $300_1$ is the optimum cell. The mobile apparatus 100 transmits a "reconnection request signal" to the source base station $300_1$. The "reconnection request signal" includes the target base station reconnection setting information. The reason is that initial connection has been completed between the mobile apparatus 100 and the target base station $300_2$.

The source base station $300_1$ compares target base station reconnection setting information included in the "reconnection request signal" and target base station reconnection setting information stored in the source base station $300_1$, and performs processing according to the comparison result. When the source base station $300_1$ determines that the target base station reconnection setting information included in the "reconnection request signal" is correct, the source base station $300_1$ performs reconnection processing. Since the source base station $300_1$ holds the target base station reconnection setting information, the source base station $300_1$ can execute reconnection by using the target base station reconnection setting information.

The target base station $300_2$ reports the target base station reconnection setting information to the source base station $300_1$, so that the source base station $300_1$ can hold the target base station reconnection setting information. Since the source base station $300_1$ can hold the target base station reconnection setting information, the mobile apparatus 100 can perform reconnection with the source base station $300_1$ even in the case where initial connection completes between the mobile apparatus 100 and the target base station $300_2$.

The mobile apparatus in accordance with the present embodiment can perform radio communication by the LTE scheme. The mobile apparatus 100 that can perform radio communication by the LTE scheme may also be able to perform radio communication by the W-CDMA scheme. In other words, the mobile apparatus 100 may be a dual-mode terminal. The dual-mode terminal can perform communication based on an existing mobile communication system (W-CDMA scheme, for example) and a newly introduced mobile communication system (LTE scheme, for example).

<Base Station>

The base station $300_n$ is connected to the MME $500_m$. The MME $500_m$ is connected to a core network 700. The base station $300_n$ covers the cell $350_n$. The mobile apparatus 100 communicates with the base station $300_n$ in the cell $350_n$ in accordance with the Evolved UTRA and UTRAN scheme. The MME may be realized with a serving gateway (SGW). The MME/SGW may be referred to as an access gateway. The base station $300_n$ may be connected to an Evolved Packet Core (EPC) (not shown).

The MME/SGW may be connected to a single base station or multiple base stations.

Figure 2:
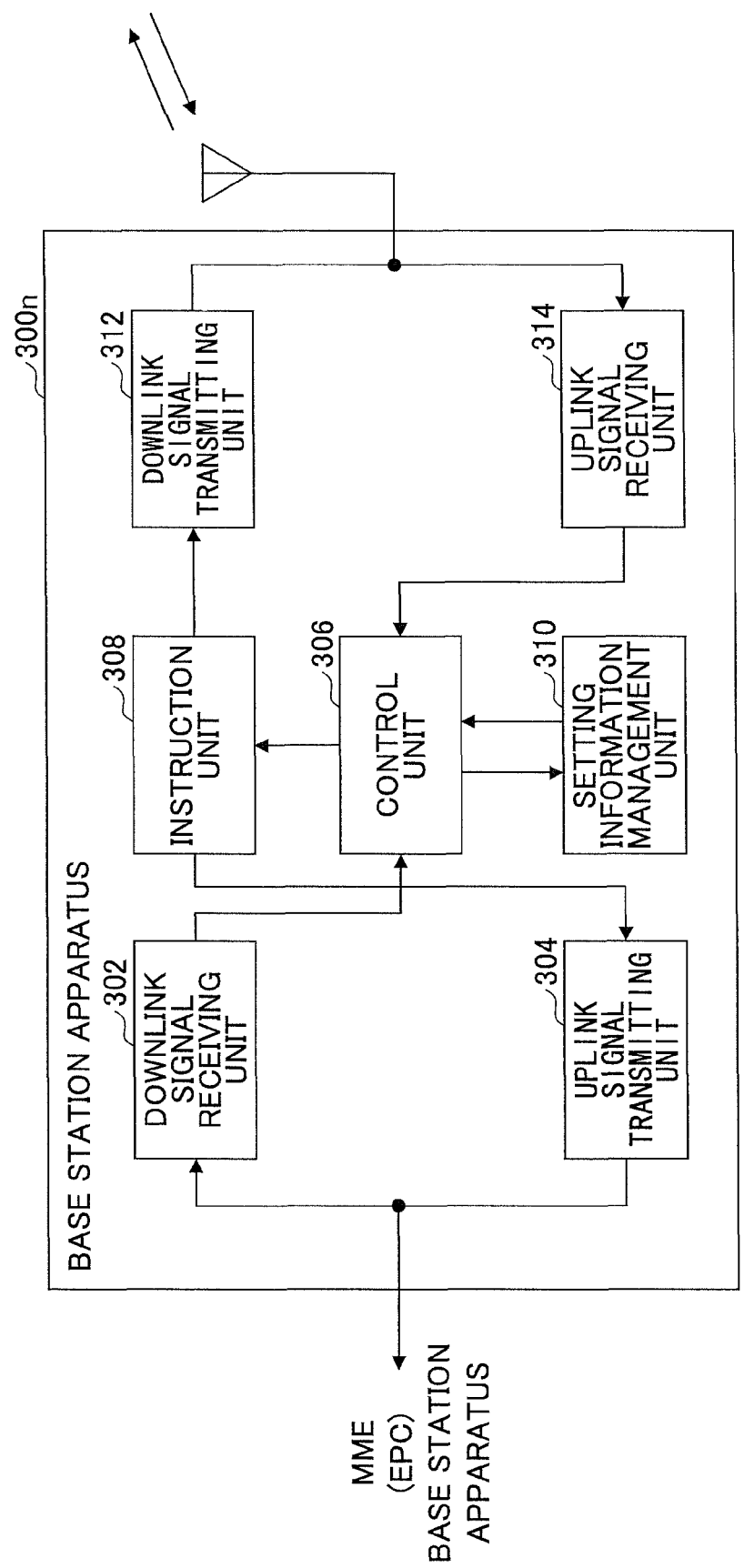
FIG. 2 is a functional block diagram showing a base station in accordance with the present embodiment.

FIG. 2 illustrates the base station $300_n$ according to the present embodiment.

The base station $300_n$ includes a downlink signal receiving unit 302. The downlink signal receiving unit 302 receives a downlink signal transmitted from an upper apparatus such as a MME, for example. The downlink signal includes a downlink signal transmitted from another mobile apparatus and received from a base station communicating with the other mobile apparatus via the MME. The downlink signal may be a downlink signal transmitted from a MME different from the MME connected to the base station $300_n$ to that MME. Also, the downlink signal receiving unit 302 receives a downlink signal transmitted by another base station, that is, another base station connected to the same MME, for example. The downlink signal receiving unit 302 supplies the received downlink signal to a control unit 106.

The downlink signal includes a handover request response signal (Handover Request Acknowledge) that is transmitted from another base station after the base station $300_n$ transmits a handover request signal (Handover Request) to the other base station. The "handover request response signal" includes target base station reconnection setting information. The target base station reconnection setting information is information for receiving a reconnection request in the target base station.

The information for receiving the reconnection request by the target base station includes a Cell-Radio Network Temporary Identifier (C-RNTI). The C-RNTI is an ID assigned to the mobile apparatus in the cell of the target base station. Also, the information for receiving the reconnection request by the target base station includes a Physical Cell ID (PCI). The PCI is a cell ID of the target base station. Also, the information for receiving the reconnection request by the target base station includes a short MAC-I. The short MAC-I is a data sequence calculated based on integrity protection function for protecting integrity of communication between the mobile apparatus and the base station. By using the data sequence, the mobile apparatus (user) can be identified and specified. For example, the data sequence for specifying the mobile apparatus is generated by using a Message Authentication Code (MAC). Predetermined bits of the MAC are set in the Short MAC-I. For example, LSB (Least Significant Bit) 16 bits may be set. The Short MAC-I is calculated based on the ID of the cell where reconnection is performed, the C-RNTI and the PCI. As the ID used for the ID of the cell where reconnection is performed, there is E-UTRAN Cell Identifier. The E-UTRAN Cell Identifier is an ID assigned for a carrier providing the mobile communication system to identify each cell.

The base station $300_n$ includes an uplink signal receiving unit 314. The uplink signal receiving unit 314 receives a radio signal transmitted from the mobile apparatus 100.

The radio signal includes a measurement result report signal. The measurement result report signal may be called a Measurement Report. The measurement result report signal includes a received level of a predetermined frequency and information indicating reception quality. The predetermined frequency includes a frequency of a serving cell where the mobile apparatus is connected and a frequency different from the frequency of the serving cell. Also, the predetermined frequency may include a frequency of a radio access technology different from the LTE. The radio access technology may include a mobile communication system of the W-CDMA scheme. A frequency band of the radio access technology different from the LTE may be the same as the frequency band of the LTE or may be different from the frequency band of the LTE.

The radio signal includes an "initial connection request signal" transmitted by the mobile apparatus 100. The "initial connection request signal" may be called a random access channel (RACH) preamble. The radio signal includes a "reconnection request signal" transmitted by the mobile apparatus 100 after the base station $300_n$ transmits the "initial connection response signal" in response to the "initial connection request signal". The "initial connection response signal" may be also called a random access channel response (RACH Response). The "reconnection request signal" may be also referred to as "RRC Connection Re-establishment Request". The uplink signal receiving unit 314 supplies the received uplink signal to the control unit 306.

The base station $300_n$ includes a setting information management unit 310. The setting information management unit 310 is connected to the control unit 306. The setting information management unit 310 manages setting information for receiving a reconnection request from the mobile apparatus 100. The setting information includes source base station reconnection setting information and target base station reconnection setting information.

The base station $300_n$ includes a control unit 306. The control unit 306 is connected to the downlink signal receiving unit 302, the uplink signal receiving unit 314, an instruction unit 308 and the setting information management unit 310. The control unit 306 instructs the instruction unit 308 to transmit a downlink signal received from the downlink signal receiving unit 302 to a destination mobile apparatus. The control unit 306 instructs the instruction unit 108 to transmit an uplink signal supplied from the uplink signal receiving unit 314 to a MME or a base station connected to a destination mobile apparatus in order to transmit the uplink signal to the destination mobile apparatus.

Figure 3:
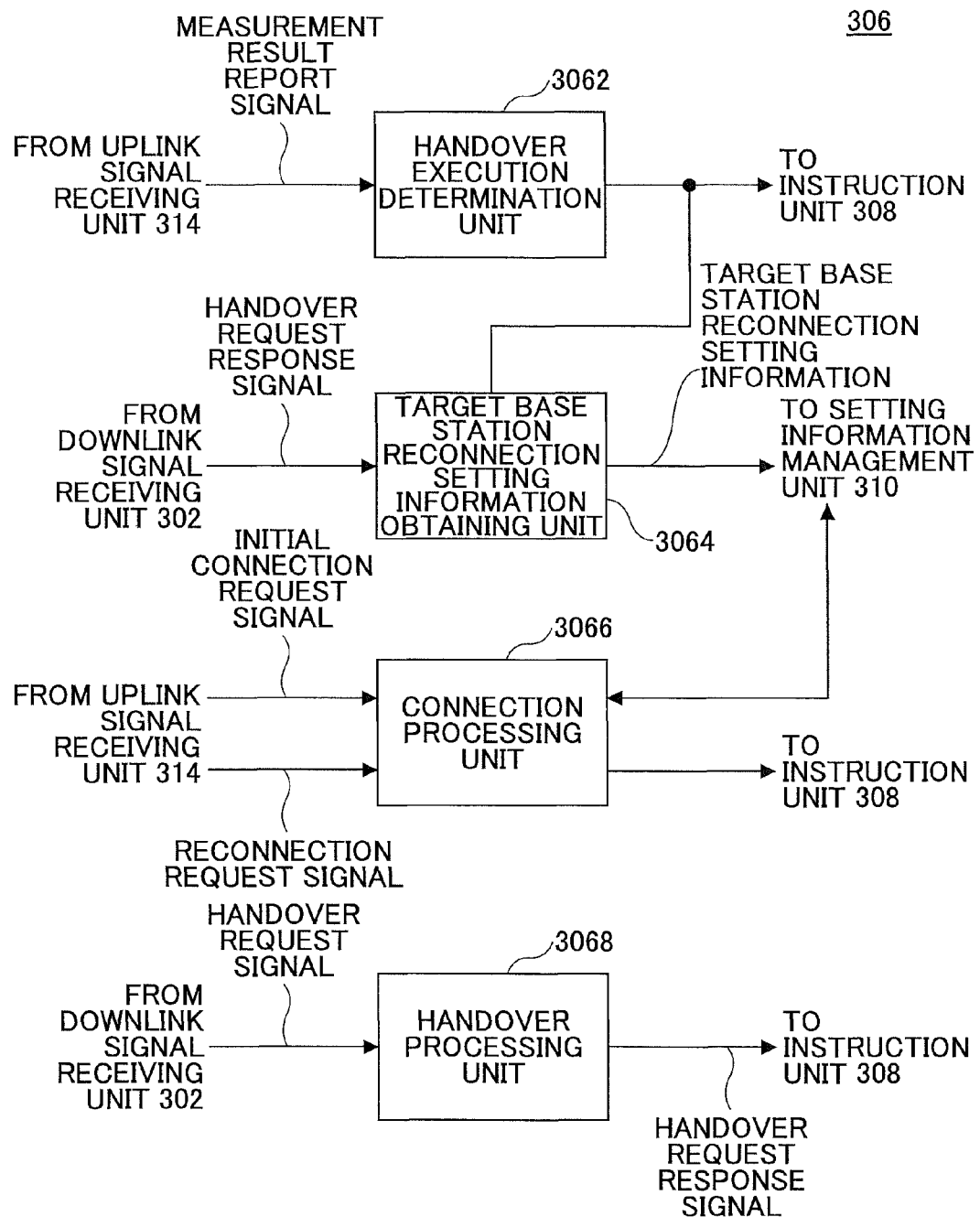
FIG. 3 is a functional block diagram showing a base station in accordance with the present embodiment.

FIG. 3 shows functions of the control unit 306.

The control unit 306 includes a handover execution determination unit 3062. The handover execution determination unit 3062 is connected to the uplink signal receiving unit 314 and the instruction unit 308. A "measurement result report signal" is supplied to the handover execution determination unit 3062 from the uplink signal receiving unit 314. The handover execution determination unit 3062 determines whether to cause the mobile apparatus 100 to perform handover based on a frequency measurement result included in the "measurement result report signal" supplied from the uplink signal receiving unit 314. When the handover execution determination unit 3062 determines to cause the mobile apparatus 100 to perform handover, the handover execution determination unit 3062 instructs the instruction unit 308 to transmit a "handover request signal". The "handover request signal" is transmitted to a candidate of a handover destination base station.

The control unit 306 includes a target base station reconnection setting information obtaining unit 3064. The target base station reconnection setting information obtaining unit 3064 is connected to the downlink signal receiving unit 302 and the setting information management unit 310. A "handover request response signal" is supplied from the downlink signal receiving unit 302 to the target base station reconnection setting information obtaining unit 3064. The "handover request response signal" is a response for the "handover request signal". The "handover request response signal" includes target base station reconnection setting information. The target base station reconnection setting information obtaining unit 3064 obtains the target base station reconnection setting information included in the "handover request response signal", and stores it in the setting information management unit 310. After the target base station reconnection setting information obtaining unit 3064 stores the target base station reconnection setting information in the setting information management unit 310, the target base station reconnection setting information obtaining unit 3064 reports, to the instruction unit 310, that a "handover instruction signal" may be sent to the mobile apparatus 100. The "handover instruction signal" may be called a "RRC Connection Reconfiguration".

The control unit 306 includes a connection processing unit 3066. The connection processing unit 3066 is connected to the uplink signal receiving unit 314 and the instruction unit 308. An "initial connection request signal" is supplied to the connection processing unit 3066 from the uplink signal receiving unit 314. A "reconnection request signal" is supplied from the uplink signal receiving unit 314 to the connection processing unit 3066.

The connection processing unit 3066 performs connection processing in accordance with the "initial connection request signal" supplied from the uplink signal receiving unit 314. After the connection processing completes, the connection processing unit 3066 instructs the instruction unit 308 to transmit the "initial connection response signal". The mobile apparatus 100 that receives the "initial connection response signal" transmits, by radio, the "reconnection request signal" to the base station that transmits the "initial connection response signal".

The connection processing unit 3066 performs reconnection processing based on the "reconnection request signal" supplied from the uplink signal receiving unit 314. For example, the mobile apparatus 100 receives a "handover instruction signal" from the source base station $300_1$, and after initial connection processing completes between the mobile apparatus 100 and the target base station $300_2$, the mobile apparatus 100 applies the target base station reconnection setting information. Therefore, the "reconnection request signal" transmitted by the mobile apparatus 100 after initial connection processing completes between the mobile apparatus 100 and the target base station $300_2$ includes the target base station reconnection setting information. In a case where, radio quality deteriorates after the target base station reconnection setting information is applied, the mobile apparatus 100 starts reconnection processing, and executes cell selection for performing reconnection. As a result of the cell selection, when the mobile apparatus 100 determines to connect to the source base station $300_1$, the mobile apparatus 100 transmits the "initial connection request signal" to the source base station $300_1$, and receives the "initial connection response signal" as a response of the "initial connection request signal". After receiving the "initial connection response signal", the mobile apparatus 100 transmits the "reconnection request signal" to the source base station $300_1$. The "reconnection request signal" includes the target base station reconnection setting information.

The connection processing unit 3066 performs reconnection processing with the mobile apparatus by using the reconnection setting information stored in the setting information management unit 310 in accordance with the "reconnection request signal" from the mobile apparatus 100. For example, the connection processing unit 3066 determines whether the reconnection setting information included in the "reconnection request signal" is correct. When the connection processing unit 3066 determines that the reconnection setting information included in the "reconnection request signal" is correct, the connection processing unit 3066 performs reconnection processing. The reason is that the mobile apparatus can be specified when it is determined that the reconnection setting information is correct. On the other hand, when the connection processing unit 3066 does not determine that the reconnection setting information included in the "reconnection request signal" is correct, in other words, when the connection processing unit 3066 determines that the reconnection setting information is incorrect, the connection processing unit 3066 does not perform reconnection processing. The reason is that, when it is determined that the reconnection setting information is determined to be incorrect, the mobile apparatus cannot be specified. In a case where the reconnection processing is not performed, reconnection fails and the call becomes call loss.

The target base station reconnection setting information is stored in the setting information management unit 310. Thus, even when the mobile apparatus 100 transmits the reconnection request signal to the source base station $300_1$ after the mobile apparatus 100 applies the target base station reconnection setting information, the base station can determine whether the reconnection setting information included in the "reconnection request signal" is correct by using the target base station reconnection setting information stored in the setting information management unit 310.

When determining that the reconnection setting information is correct, the connection processing unit 3066 accepts reconnection, and when determining that the reconnection setting information is incorrect, the connection processing unit 3066 rejects reconnection. When it is determined to accept reconnection, the connection processing unit 3066 performs reconnection processing. After the reconnection processing, the connection processing unit 3066 instructs the instruction unit 308 to transmit the "reconnection request response signal". Also, the connection processing unit 3066 completes reconnection processing based on the "reconnection complete signal" to be supplied by the uplink signal receiving unit 314.

The control unit 306 includes a handover processing unit 3068. The handover processing unit 3068 is connected to the downlink signal receiving unit 302 and the instruction unit 308. The "handover request signal" is supplied from the downlink signal receiving unit 302 to the handover processing unit 3068. When the "handover request signal" is supplied from the downlink signal receiving unit 302 to the handover processing unit 306, the handover processing unit 3068 generates target base station reconnection setting information based on setting information (Configuration) of the base station. The handover processing unit 3068 reports the target base station reconnection setting information to the source base station. For example, the handover processing unit 3068 may report the target base station reconnection setting information to the source base station by including it in a "handover request response signal" that is a response signal for the handover request signal. In the case when the target base station reconnection setting information is reported by including it in the "handover request response signal", a region for storing the target base station reconnection setting information may be prepared in the "handover request response signal" as new information element (IE). The handover processing unit 3068 instructs the instruction unit 308 to transmit the "handover request response signal" including the target base station reconnection setting information.

The base station $300_n$ includes the instruction unit 308. The instruction unit 308 is connected to the control unit 306, the downlink signal transmitting unit 312 and the uplink signal transmitting unit 304.

The instruction unit 308 provides an indication to transmit an uplink signal in accordance with an instruction from the control unit 306. For example, the instruction unit 308 may instruct the uplink signal transmitting unit 304 to transmit an uplink signal from the uplink signal receiving unit 314 to the MME in accordance with an instruction by the control unit 306.

Also, the instruction unit 308 issues an instruction to transmit a downlink signal in accordance with an instruction from the control unit 306. For example, the instruction unit 308 may instruct the downlink signal transmitting unit 312 to transmit a downlink signal from the downlink signal receiving unit 302 to the mobile apparatus 100 in accordance with the instruction from the control unit 306.

Also, the instruction unit 308 issues an instruction to transmit an uplink signal in accordance with an instruction from the control unit 306. For example, the instruction unit 308 instructs the uplink signal transmitting unit 304 to transmit the "handover request signal" to another base station in accordance with an instruction by the handover execution determination unit 3062, and the instruction unit 308 instructs the uplink signal transmitting unit 304 to transmit the "handover request response signal" to another base station in accordance with an instruction by the handover processing unit 3068.

Also, the instruction unit 308 provides an instruction for transmitting a downlink signal in accordance with an instruction by the control unit 306. For example, the instruction unit 308 instructs the downlink signal transmitting unit 312 to transmit the "handover instruction signal" to the mobile apparatus 100 in accordance with an instruction by the target base station reconnection setting information obtaining unit 3064, and to transmit the "initial connection response signal" to the mobile apparatus 100 in accordance with an instruction by the connection processing unit 3066. In addition, for example, the instruction unit 308 instructs the downlink signal transmitting unit 312 to transmit the "reconnection request response signal" to the mobile apparatus 100 in accordance with an instruction by the connection processing unit 3066.

The base station $300_n$ includes the uplink signal transmitting unit 304. The uplink signal transmitting unit 304 is connected to the instruction unit 308. The uplink signal transmitting unit 304 transmits an uplink signal in accordance with an instruction by the instruction unit 308.

The base station $300_n$ includes the downlink signal transmitting unit 312. The downlink signal transmitting unit 312 is connected to the instruction unit 308. The downlink signal transmitting unit 312 transmits a downlink signal in accordance with an instruction by the instruction unit 308.

<Operation of the Base Station>

Figure 4:
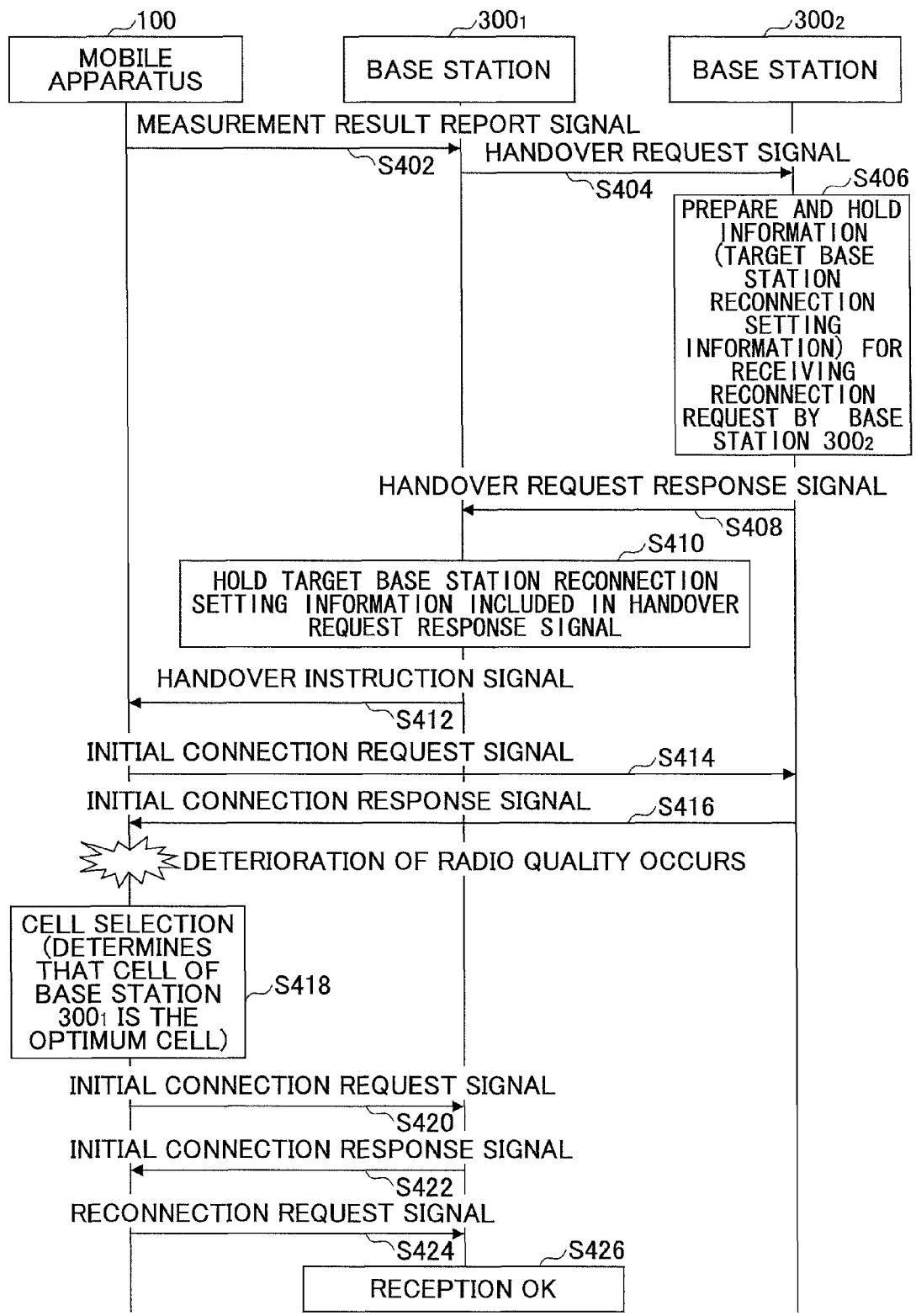
FIG. 4 is a sequence chart for explaining operation of a base station in accordance with the present embodiment.

FIG. 4 is a sequence chart showing operation of the base station.

In this embodiment, as an example, a case is described where the mobile apparatus 100 is caused to perform handover from a base station of a handover source, that is, in other words, the base station $300_1$ that is a source base station to a base station of a handover destination, that is, in other words, the base station $300_2$ that is a target base station.

The mobile apparatus 100 transmits a "measurement result report signal" to the base station $300_1$ (step S402).

The base station $300_1$ that receives the "measurement result report signal" from the mobile apparatus 100 determines to cause the mobile apparatus 100 to perform handover to the base station $300_2$ based on a frequency measurement result included in the "measurement result report signal". The base station $300_1$ transmits a "handover request signal" to the base station $300_2$ (step S404). For example, the "measurement result report signal" is received by the uplink signal receiving unit 314 of the base station $300_1$. The uplink signal receiving unit 314 supplies the "measurement result report signal" to the handover execution determination unit 3062. The handover execution determination unit 3062 determines whether to cause the mobile apparatus 100 to perform handover based on the "measurement result report signal" supplied from the uplink signal receiving unit 314. When the handover execution determination unit 3062 determines to cause the mobile apparatus 100 to perform handover, the handover execution determination unit 3062 instructs the instruction unit 308 to transmit a "handover request signal". The "handover request signal" is transmitted from the uplink signal transmitting unit 304 to the base station $300_2$.

The base station $300_2$ that receives the "handover request signal" generates information (target base station reconnection setting information) for receiving a reconnection request by the base station $300_2$. The target setting information is held in the base station $300_2$ (step S406). For example, the "handover request signal" from the base station $300_1$ is received by the downlink signal receiving unit 302 of the base station $300_2$. The downlink signal receiving unit 302 supplies the "handover request signal" to the handover processing unit 3068. When the "handover request signal" is supplied from the downlink signal receiving unit 302, the handover processing unit 3068 generates the target base station reconnection setting information based on setting information of the base station $300_2$. For example, the handover processing unit 3068 generates target base station reconnection setting information including C-RNTI. In addition, the handover processing unit 3068 may generate target base station reconnection setting information including PCI. Also, the handover processing unit 3068 may generate target base station reconnection setting information including Short MAC-I. The Short MAC-I is calculated based on the ID of the cell where reconnection is performed, C-RNTI and PCI.

The base station $300_2$ reports the target base station reconnection setting information to the base station $300_1$. For example, the base station $300_2$ reports the target base station reconnection setting information to the source base station $300_1$ by including it in a "handover request response signal" (step S408). For example, the handover processing unit 3068 reports the target base station reconnection setting information to the base station $300_1$. For example, the handover processing unit 3068 may report the target base station reconnection setting information to the base station $300_1$ by including it in a "handover request response signal" (by concatenating it with "handover request response signal", for example) that is a response signal for the "handover request signal".

The base station $300_1$ that receives the "handover request response signal" from the base station $300_2$ holds the target base station reconnection setting information reported by the base station $300_2$ (step S410). For example, the target base station reconnection setting information obtaining unit 3064 obtains the target base station reconnection setting information included in the "handover request response signal", and stores it in the setting information management unit 310.

The base station $300_1$ transmits a handover instruction signal to the mobile apparatus 100 (step S412). For example, after the target base station reconnection setting information obtaining unit 3064 stores the target base station reconnection setting information in the setting information management unit 310, the target base station reconnection setting information obtaining unit 3064 reports to the instruction unit 308 that the "handover instruction signal" may be transmitted to the mobile apparatus 100. The instruction unit 308 instructs the downlink signal transmitting unit 312 to transmit the "handover instruction signal".

The mobile apparatus 100 transmits an "initial connection request signal" to the base station $300_2$ (step S414).

The base station $300_2$ performs initial connection processing in accordance with the "initial connection request signal" from the mobile apparatus 100. After the initial connection processing completes, the base station $300_2$ transmits an "initial connection response signal" to the mobile apparatus 100 (step S416). For example, the connection processing unit 3066 performs connection processing in accordance with the "initial connection request signal" supplied from the uplink signal receiving unit 314. After the connection processing completes, the connection processing unit 3066 instructs the instruction unit 308 to transmit an "initial connection response signal". The instruction unit 308 transmits the "initial connection response signal" from the downlink signal transmitting unit 312.

After receiving the "initial connection response signal" from the base station $300_2$, the mobile apparatus 100 detects deterioration of radio quality, so as to start reconnection processing.

The mobile apparatus 100 performs cell selection (step S418). As a result of the cell selection, the mobile apparatus 100 determines that the base station $300_1$ is a cell to connect to. For example, when the mobile apparatus 100 determines that, after transmitting the "handover complete signal" to the base station $300_2$, the "handover complete signal" is not received by the base station $300_2$, the mobile apparatus 100 may execute cell selection. Also, for example, when the "handover complete signal" is not received by the base station $300_2$ after the mobile apparatus 100 transmits the "handover complete signal" to the base station $300_2$, the mobile apparatus 100 may execute cell selection.

The mobile apparatus 100 transmits an "initial connection request signal" to the base station $300_1$ (step S420).

The base station $300_1$ performs initial connection processing in accordance with the "initial connection request signal" from the mobile apparatus 100. After the initial connection processing completes, the base station $300_1$ transmits an "initial connection response signal" to the mobile apparatus 100 (step S422). For example, the connection processing unit 3066 performs initial connection processing in accordance with the "initial connection request signal" supplied from the uplink signal receiving unit 314. After the connection processing completes, the connection processing unit 3066 instructs the instruction unit 308 to transmit the "initial connection response signal". The instruction unit 308 transmits the "initial connection response signal" from the downlink signal transmitting unit 312.

The mobile apparatus 100 transmits a "reconnection request signal" to the base station $300_1$ (step S424).

The base station $300_1$ performs reconnection processing in accordance with the "reconnection request signal" from the mobile apparatus 100 (step S426). The base station $300_1$ determines that the "reconnection request signal" is acceptable since reconnection setting information included in the "reconnection request signal" is the same as the target base station reconnection setting information held by the base station $300_1$. For example, the connection processing unit 3066 performs reconnection processing with the mobile apparatus by using the reconnection setting information stored in the setting information management unit 310 in accordance with the "reconnection request signal" from the mobile apparatus 100. For example, the connection processing unit 3066 determines whether the reconnection setting information included in the "reconnection request signal" is correct. The connection processing unit 3066 compares the reconnection setting information stored in the setting information management unit 310 with the reconnection setting information included in the "reconnection request signal", and when the reconnection setting information is determined to be correct, the connection processing unit 3066 performs reconnection processing. The reason is that, when the reconnection setting information is determined to be correct, the mobile apparatus can be specified. On the other hand, when he connection processing unit 3066 compares the reconnection setting information stored in the setting information management unit 310 with the reconnection setting information included in the "reconnection request signal", and the reconnection setting information is not determined to be correct, in other words, when the reconnection setting information is determined to be incorrect, the connection processing unit 3066 does not perform reconnection processing. The reason is that, when the reconnection setting information is determined to be incorrect, the mobile apparatus cannot be specified. When the reconnection processing is not performed, reconnection fails and the call becomes call loss.

According to the present embodiment, by reporting the target base station reconnection setting information from the target base station to the source base station, the source base station can hold the target base station reconnection setting information, so that the mobile apparatus can perform reconnection with the source base station even when initial connection completes between the mobile apparatus and the target base station.

MODIFIED EXAMPLE

Radio Communication System

An environment to which a base station of the modified example is applied is the same as the environment shown in FIG. 1. Since the environment is the same as the environment shown in FIG. 1, description of the environment is not given.

The mobile apparatus 100 performs radio quality measurement, and transmits "measurement result report signal" to a base station communicating with the mobile apparatus 100 when the mobile apparatus 100 determines that radio quality of another base station is good. When the base station receives the "measurement result report signal", the base station transmits a "handover request signal" to a base station that is a handover destination candidate. As an example, in this modified example, a case is described where the mobile apparatus performs handover from the base station $300_1$ to a base station $300_3$. In the handover from the base station $300_1$ to the base station $300_3$, since the base station $300_1$ and the base station $300_3$ are connected to different MMEs, handover straddling MMEs is performed. The handover between base stations connected to different MMEs is called S1 handover. In the following, the base station $300_1$ may be called "source base station $300_1$," and the base station $300_3$ may be called "target base station $300_3$".

When the target base station $300_3$ receives the "handover request signal" from the source base station $300_1$, the target base station $300_3$ generates reconnection setting information (target base station reconnection setting information) for receiving reconnection from the mobile apparatus 100. For example, the "handover request signal (Handover Required)" transmitted by the source base station $300_1$ is transmitted from the MME $500_1$ to the MME $500_2$. The MME $500_2$ transmits the "handover request signal (Handover Required)" from the source base station $300_1$ to the base station $300_3$ as a "handover request signal (Handover Request)".

The target base station $300_3$ transmits a "handover request response signal" to the source base station $300_1$. The "handover request response signal" includes the target base station reconnection setting information. The target base station $300_3$ may transmit the target base station reconnection setting information to the source base station $300_1$. The "handover request response signal" is transmitted to the MME $500_1$ from the MME $500_2$. The MME $500_1$ obtains the target base station reconnection setting information included in the "handover request response signal". The MME $500_1$ includes the target base station reconnection setting information in a "handover command signal". The "handover command signal" may be also referred to as a handover command. The MME $500_1$ transmits the "handover command signal" to the base station $300_1$.

When the source base station $300_1$ receives the "handover command signal" from the MME $500_1$, the source base station $300_1$ obtains the target base station reconnection setting information from the "handover command signal" and holds it.

Initial connection completes between the mobile apparatus 100 and the target base station $300_3$. After the initial connection completes, the mobile apparatus 100 detects deterioration of radio quality so that the mobile apparatus 100 starts reconnection processing. In a case where radio quality deteriorates, even though the mobile apparatus 100 transmits the "handover complete signal" to the target base station $300_3$, there may be a case in which the "handover complete signal" is not received by the target base station $300_3$. The mobile apparatus 100 performs cell selection for perform reconnection. As a result of the cell selection, the mobile apparatus 100 determines that the source base station $300_1$ is the optimum cell. The mobile apparatus 100 transmits a "reconnection request signal" to the source base station $300_1$. The "reconnection request signal" includes the target base station reconnection setting information. The reason is that initial connection has been completed between the mobile apparatus 100 and the target base station $300_3$.

The source base station $300_1$ compares the target base station reconnection setting information included in the "reconnection request signal" with the stored target base station reconnection setting information, and performs processing according to the comparison result. When the source base station $300_1$ determines that the target base station reconnection setting information included in the "reconnection request signal" is correct, the source base station $300_1$ performs reconnection processing. Since the source base station $300_1$ holds the target base station reconnection setting information, the source base station $300_1$ can execute reconnection by using the target base station reconnection setting information.

The target base station $300_3$ reports the target base station reconnection setting information to the source base station $300_1$, so that the source base station $300_1$ can hold the target base station reconnection setting information. Since the source base station $300_1$ can hold the target base station reconnection setting information, the mobile apparatus 100 can perform reconnection with the source base station $300_1$ even in the case where initial connection has completed between the mobile apparatus 100 and the target base station $300_3$.

<Base Station>

The base station $300_n$ in accordance with the modified example is explained by the base station described with reference to FIG. 2. In the base station of the modified example, the control unit 306 includes a different function compared to the base station shown in FIG. 2.

Figure 5:
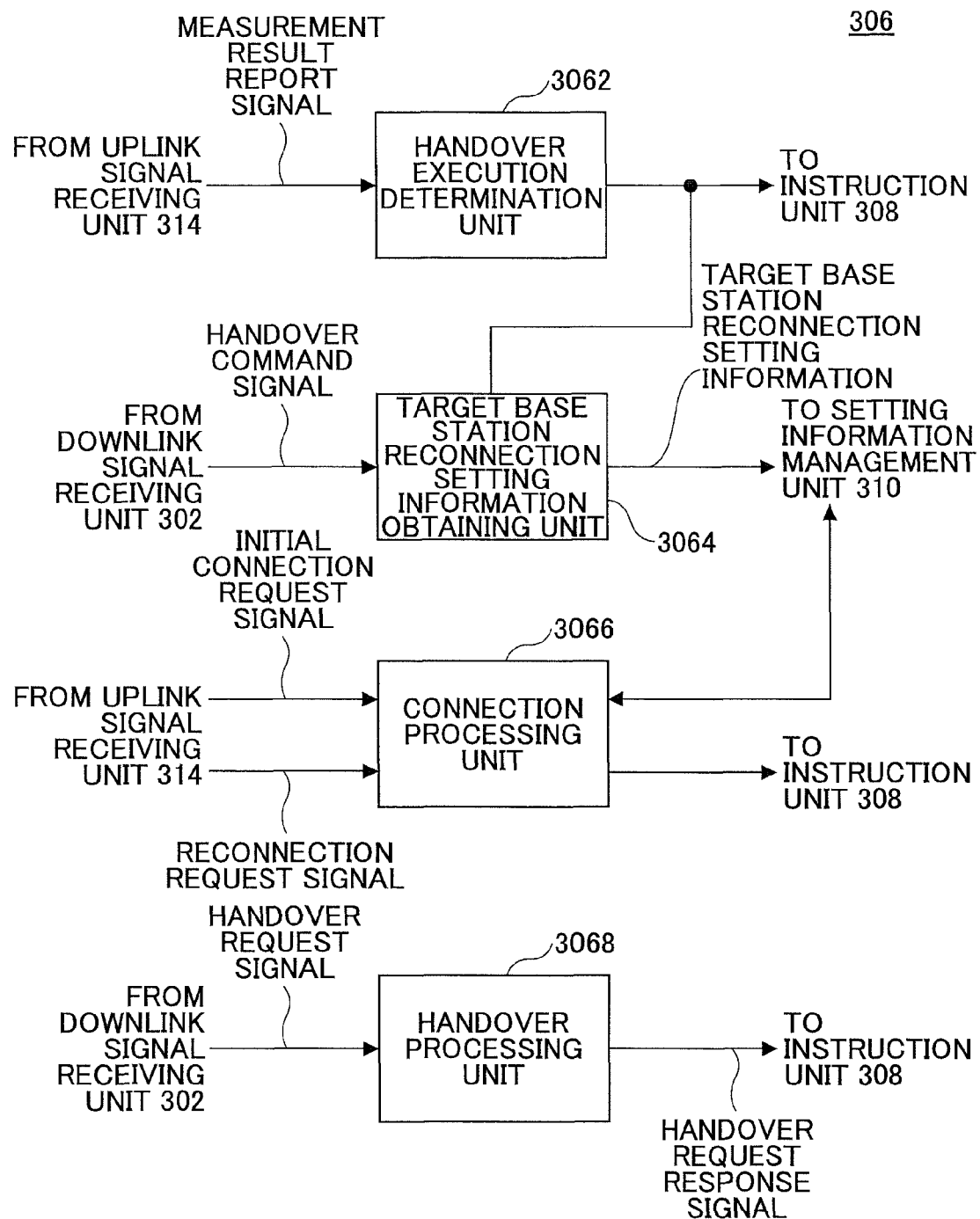
FIG. 5 is a functional block diagram showing a base station in accordance with the present embodiment.

FIG. 5 shows functions of the control unit 306. The base station $300_n$ in accordance with the modified example is different from the base station of the above-mentioned embodiment in the function of the target base station reconnection setting information obtaining unit 3064.

The "handover command signal" is supplied to the target base station reconnection setting information obtaining unit 3064. The "handover command signal" is a response for the "handover request signal". The "handover command signal" includes the target base station reconnection setting information. The target base station reconnection setting information obtaining unit 3064 obtains the target base station reconnection setting information included in the "handover command signal", and stores it in the setting information management unit 310. After the target base station reconnection setting information obtaining unit 3064 stores the target base station reconnection setting information in the setting information management unit 310, the target base station reconnection setting information obtaining unit 3064 reports to the instruction unit 308 that the "handover instruction signal" may be transmitted to the mobile apparatus 100.

<Operation of the Base Station>

Figure 6:
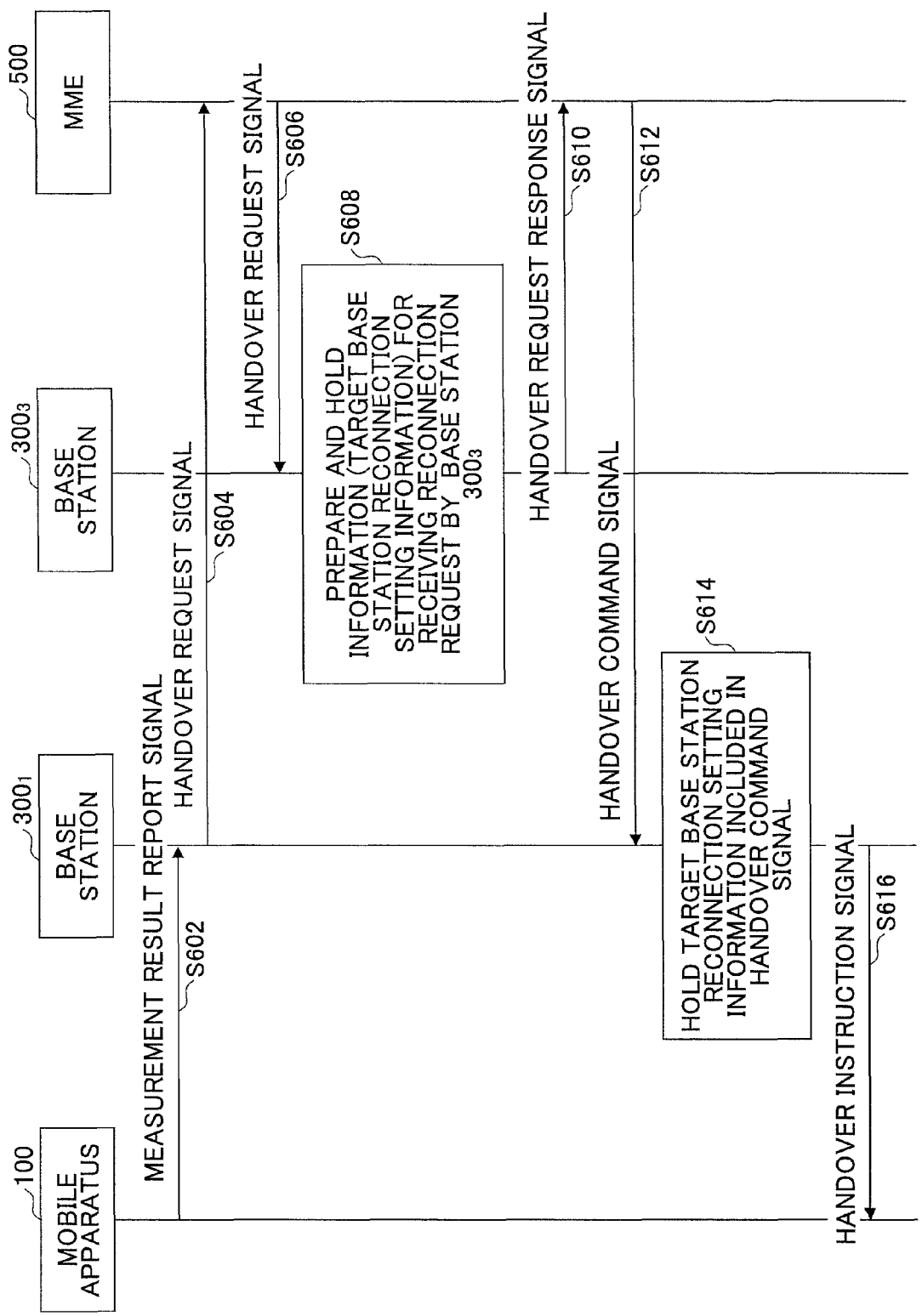
FIG. 6 is a sequence chart for explaining operation of a base station in accordance with the present embodiment.

FIG. 6 is a sequence chart showing an example of operation of the base station.

In this modified example, in the environment shown in FIG. 1 as an example, a case is described where the mobile apparatus 100 is caused to perform handover from a base station of a handover source, that is, in other words, the base station $300_1$ that is a source base station to a base station of a handover destination, that is, in other words, the base station $300_3$ that is a target base station. In FIG. 6, for the sake of convenience of explanation, the MME $500_1$ and the MME $500_2$ are collectively referred to as a MME 500. The MME $500_1$ may be referred to as a source MME, and the MME $500_2$ may be referred to as a target MME.

The mobile apparatus 100 transmits a "measurement result report signal" to the base station $300_1$ (step S602).

The base station $300_1$ that receives the "measurement result report signal" from the mobile apparatus 100 determines to cause the mobile apparatus 100 to perform handover to the base station $300_3$ based on a frequency measurement result included in the "measurement result report signal". The base station $300_1$ transmits a "handover request signal" to the base station $300_3$ (steps S604, S606). For example, the "measurement result report signal" from the mobile apparatus 100 is received by the uplink signal receiving unit 314 of the base station $300_1$. The uplink signal receiving unit 314 supplies the "measurement result report signal" to the handover execution determination unit 3062. The handover execution determination unit 3062 determines whether to cause the mobile apparatus 100 to perform handover based on the "measurement result report signal" supplied from the uplink signal receiving unit 314. When the handover execution determination unit 3062 determines to cause the mobile apparatus 100 to perform handover, the handover execution determination unit 3062 instructs the instruction unit 308 to transmit a "handover request signal". The "handover request signal" is transmitted from the uplink signal transmitting unit 304 to the base station $300_3$ via the MME 500.

The base station $300_3$ that receives the "handover request signal" generates information (target base station reconnection setting information) for receiving a reconnection request by the base station $300_3$. The target information is held in the base station $300_3$ (step S608). For example, the "handover request signal" from the base station $300_1$ is received by the downlink signal receiving unit 302 of the base station $300_3$. The downlink signal receiving unit 302 supplies the "handover request signal" to the handover processing unit 3068. When the "handover request signal" is supplied from the downlink signal receiving unit 302, the handover processing unit 3068 generates the target base station reconnection setting information based on setting information of the base station $300_3$. For example, the handover processing unit 3068 generates target base station reconnection setting information including C-RNTI. In addition, the handover processing unit 3068 may generate target base station reconnection setting information including PCI. Also, the handover processing unit 3068 may generate target base station reconnection setting information including Short MAC-I. The Short MAC-I is calculated based on the ID of the cell where reconnection is performed, C-RNTI and PCI.

The base station $300_3$ reports the target base station reconnection setting information to the base station $300_1$. For example, the base station $300_3$ reports the target base station reconnection setting information to the base station $300_1$ by including it in a "handover request response signal" (step S610). For example, the handover processing unit 3068 reports the target base station reconnection setting information to the base station $300_1$. For example, the handover processing unit 3068 may report the target base station reconnection setting information to the base station $300_1$ by including it in a "handover request response signal" that is a response signal for the "handover request signal". An information element of the "handover request response signal" includes a region where information can be set that only the base station $300_1$ can refer to. The target base station reconnection setting information may be included in the region. The region may be referred to as Target to Source Transparent Container.

The "handover request response signal" is transmitted to the MME 500. The MME 500 obtains the target base station reconnection setting information included in the "handover request response signal", and transmits the obtained target base station reconnection setting information to the base station $300_1$ by including it in the "handover command signal" (step S612). If the target base station reconnection setting information is included in the Target to Source Transparent Container, the above process is not necessary.

The base station $300_1$ holds the target base station reconnection setting information reported by the base station $300_3$ (step S614). For example, the target base station reconnection setting information obtaining unit 3064 obtains the target base station reconnection setting information included in the "handover command signal", and stores it in the setting information management unit 310.

The base station $300_1$ transmits a "handover instruction signal" to the mobile apparatus 100 (step S616). For example, after the target base station reconnection setting information obtaining unit 3064 stores the target base station reconnection setting information in the setting information management unit 310, the target base station reconnection setting information obtaining unit 3064 reports to the instruction unit 308 that the "handover instruction signal" may be transmitted to the mobile apparatus 100. The instruction unit 308 instructs the downlink signal transmitting unit 312 to transmit the "handover instruction signal".

Processing after step S616 is the same as steps S414-S426 described with reference to FIG. 4.

According to the modified embodiment, even in handover straddling MMEs, by reporting the target base station reconnection setting information from the target base station to the source base station, the source base station can hold the target base station reconnection setting information, so that the mobile apparatus can perform reconnection with the source base station even when initial connection has completed between the mobile apparatus and the target base station.

A base station according to an embodiment is a base station that performs radio communication with a mobile apparatus, including:

a reconnection setting information generation unit, as a handover processing unit, configured, in a case where handover is requested from a first base station, after a reconnection request signal is received from the mobile apparatus, to generate reconnection setting information to be used for specifying the mobile apparatus;

a transmission unit, as a handover processing unit, configured to transmit a reconnection request signal generated by the reconnection setting information generation unit to the first base station;

a receiving unit, as a downlink signal receiving unit, configured to receive reconnection setting information to be used for specifying the mobile apparatus from a second base station that is a destination of handover of the mobile apparatus after the second base station receives a reconnection request signal from the mobile apparatus;

a reconnection setting information holding unit, as a setting information management unit, configured to hold the reconnection setting information received by the receiving unit; and a reconnection processing unit, as a connection processing unit, configured to perform reconnection processing with the mobile apparatus by using the reconnection setting information held in the reconnection setting information holding unit in accordance with a reconnection request signal from the mobile apparatus after initial connection processing between the second base station and the mobile apparatus.

Since the source base station can hold the target base station reconnection setting information, the mobile apparatus can perform reconnection with the source base station even after initial connection completes between the mobile apparatus and the target base station.

The second base station transmits a handover request response signal including the reconnection setting information, and the base station includes a reconnection setting information obtaining unit, as a target base station reconnection setting information obtaining unit, configured to obtain the reconnection setting information included in the handover request response signal received by the receiving unit, and the reconnection setting information holding unit holds the reconnection setting information obtained by the reconnection setting information obtaining unit.

It is possible to transmit the handover request response signal by including the target base station reconnection setting information in it.

The reconnection setting information includes a cell ID of the second base station, an identifier assigned to the mobile apparatus by the second base station, and identification information for identifying the mobile apparatus by the second base station.

The mobile apparatus transmits a reconnection request signal to the base station, wherein the reconnection request signal includes a cell ID of the second base station, an identifier assigned by the second base station, and identification information for identifying the mobile apparatus by the second base station, and the reconnection processing unit performs reconnection processing when the cell ID of the second base station, the identifier and the identification information are correct.

It is possible to determine whether the reconnection request signal transmitted by the mobile apparatus is correct by using the target base station reconnection setting information that is held in the base station.

A method according to the embodiment is a method in a base station that performs radio communication with a mobile apparatus, including:

a receiving step of receiving reconnection setting information to be used for specifying the mobile apparatus from another base station that is a destination of handover of the mobile apparatus after the other base station receives a reconnection request signal from the mobile apparatus;

a reconnection setting information holding step of holding the reconnection setting information received by the receiving step;

a reconnection processing step of performing reconnection processing with the mobile apparatus by using the reconnection setting information held by the reconnection setting information holding step in accordance with a reconnection request signal from the mobile apparatus after initial connection processing between the other base station and the mobile apparatus; and a reconnection setting information transmission step of transmitting reconnection setting information to a base station that transmits a handover request signal, wherein the reconnection setting information is to be used for performing reconnection processing with the mobile apparatus and is set in accordance with the handover request signal for causing the mobile apparatus to perform handover.

In the above, the present invention has been explained while referring to the specific embodiments. However, these are merely exemplary. Those skilled in the art will conceive of various modified examples, corrected examples, alternative examples, substituted examples, and the like. For convenience of explanation, the apparatus according to the embodiment of the present invention has been explained by using a functional block diagram. However, the apparatus may be implemented in hardware, software, or a combination thereof. The present invention is not limited to the above-mentioned embodiment and is intended to include various variations, modifications, alterations, substitutions and so on without departing from the spirit of the present invention.

The present international application claims priority based on Japanese patent application No. 2010-145547, filed in the JPO on Jun. 25, 2010, and the entire contents of the Japanese patent application No. 2010-145547 are incorporated herein by reference.

DESCRIPTION OF REFERENCE SIGNS

100 mobile apparatus
300$_n$ (n is an integer satisfying n>1) base station
302 downlink signal receiving unit 304
306 control unit
3062 handover execution determination unit
3064 target base station reconnection setting information obtaining unit
3066 connection processing unit
3068 handover processing unit
308 instruction unit
310 setting information management unit
312 downlink signal transmitting unit
314 uplink signal receiving unit
$350_n$ (n is an integer satisfying n>1) cell
$500_m$ (m is an integer of m>0) Mobility Management Entity (MME)
700 core network (CN)

The invention claimed is:

1. A base station that performs radio communication with a mobile apparatus, comprising:
    a handover request unit configured to transmit a handover request signal to another base station based on a measurement report signal received from the mobile apparatus;
    a receiving unit configured to receive, from the other base station, a handover request response signal including a first reconnection setting information generated by the other base station;
    a reconnection setting information holding unit configured to hold the first reconnection setting information included in the handover request response signal received by the receiving unit;
    a transmission unit configured to transmit, to the mobile apparatus, a handover instruction signal to instruct the mobile apparatus to perform handover to the other base station; and
    a reconnection processing unit configured to receive a reconnection request signal including a second reconnection setting information from the mobile apparatus that has received the handover instruction signal to instruct handover to the other base station, and to perform reconnection with the mobile apparatus by comparing the first reconnection setting information held in the reconnection setting information holding unit with the second reconnection setting information included in the reconnection request signal.

2. The base station as claimed in claim 1, wherein the first reconnection setting information includes a cell ID of the other base station, an identifier assigned to the mobile apparatus by the other base station, and an identification information for identifying the mobile apparatus by the other base station.

3. The base station as claimed in claim 1, wherein the mobile apparatus transmits the reconnection request signal to the base station, wherein the reconnection request signal includes a cell ID of the other base station, an identifier assigned by the other base station, and an identification information for identifying the mobile apparatus by the other base station, and
    the reconnection processing unit performs reconnection processing when the cell ID of the other base station, the identifier and the identification information are correct.

4. A method in a base station that performs radio communication with a mobile apparatus, comprising:
    a handover request step for transmitting a handover request signal to another base station based on a measurement report signal received from the mobile apparatus;
    a receiving step for receiving, from the other base station, a handover request response signal including a first reconnection setting information generated by the other base station;
    a reconnection setting information holding step for holding the first reconnection setting information included in the received handover request response signal;
    a transmission step for transmitting, to the mobile apparatus, a handover instruction signal to instruct the mobile apparatus to perform handover to the other base station; and
    a reconnection processing step for receiving a reconnection request signal including a second reconnection setting information from the mobile apparatus that has received the handover instruction signal to instruct handover to the other base station, and for performing reconnection with the mobile apparatus by comparing the first reconnection setting information held in the reconnection setting information holding step with the second reconnection setting information included in the reconnection request signal.

5. The base station as claimed in claim 1, wherein the reconnection processing unit performs reconnection with the mobile apparatus when the first reconnection setting information and the second reconnection setting information are coinciding.

6. The base station as claimed in claim 1, wherein the reconnection request signal is received from the mobile apparatus by the reconnection processing unit when a radio quality between the mobile apparatus and the other base station deteriorates after an initial connection processing between the mobile apparatus and the other base station.

* * * * *